United States Patent [19]

Stiles, Jr.

[11] Patent Number: 5,404,305

[45] Date of Patent: Apr. 4, 1995

[54] CONTROL OF PILOT CONTROL STATION AUTHORITY FOR A DUAL PILOTED FLIGHT CONTROL SYSTEM

[75] Inventor: Lorren Stiles, Jr., Roxbury, Conn.

[73] Assignee: United Technologies Corporation, Hartford, Conn.

[21] Appl. No.: 153,684

[22] Filed: Nov. 17, 1993

[51] Int. Cl.⁶ .............................................. G05G 9/10
[52] U.S. Cl. ..................................... 364/434; 244/234
[58] Field of Search ........................ 74/469, 471 XY; 318/564; 273/DIG. 28; 364/435, 433, 434; 244/234, 236, 196, 197, 237, 223

[56] References Cited

U.S. PATENT DOCUMENTS

| | | | |
|---|---|---|---|
| 3,987,986 | 10/1976 | Shockley, Jr. | 244/83 F |
| 4,114,843 | 9/1978 | Robinson | 244/84 |
| 4,420,808 | 12/1983 | Diamond et al. | 364/434 |
| 4,688,443 | 8/1987 | Fabre et al. | 74/471 XY |
| 4,716,399 | 12/1987 | Nordlund | 74/471 XY |
| 4,865,277 | 9/1989 | Smith et al. | 244/234 |
| 4,914,976 | 4/1990 | Wyllie | 74/523 |
| 5,002,241 | 3/1991 | Tizac | 244/237 |
| 5,076,517 | 12/1991 | Ferranti et al. | 74/471 XY |
| 5,125,602 | 6/1992 | Vauvelle | 244/223 |
| 5,137,234 | 8/1992 | Sakurai | 244/234 |
| 5,149,023 | 9/1992 | Sakurai | 74/471 XY |
| 5,190,243 | 3/1993 | Guimbal | 244/17.25 |
| 5,291,113 | 3/1994 | Hegg et al. | 244/234 |

Primary Examiner—Kevin J. Teska
Assistant Examiner—Stephen J. Walder, Jr.
Attorney, Agent, or Firm—Michael Grillo

[57] ABSTRACT

In a dual station sidearm control system, a pilot control station provides pilot control signals in response to pilot activation of a pilot sidearm controller (210) and a co-pilot station provides co-pilot control signals in response to co-pilot activation of a co-pilot sidearm controller (211). The pilot control signals and the co-pilot control signals are combined (220) to provide dual station control signals for controlling aircraft attitude in the yaw, pitch, roll and lift attitude axes. A priority detector function (222) is responsive to pilot control signals in one of the attitude axes for reducing the priority of co-pilot control signals with respect to pilot control signals in the one attitude axis as the magnitude of pilot control signals increases in the one attitude axis. An attenuator function (225) is responsive to co-pilot control signals in the one attitude axis for attenuating the priority mismatch between pilot control signals and co-pilot control signals as the magnitude of co-pilot control signals increases in the one attitude axis.

17 Claims, 5 Drawing Sheets

CONTROL OF PILOT CONTROL STATION AUTHORITY FOR A DUAL PILOTED FLIGHT CONTROL SYSTEM

TECHNICAL FIELD

The present invention relates to a dual piloted aircraft control system and more particularly to determination of control input priority when control inputs are received from both control stations in an aircraft having two control stations.

BACKGROUND OF THE INVENTION

In both fixed wing and rotary wing (helicopter) aircraft it is common for the pilot to use a variety of position controls, such as sticks, levers, wheels and pedals, to position the control and aerodynamic surfaces of the aircraft, to thereby control the aircraft attitude, altitude, speed and the like. In more complicated systems, the controls may have mechanical connections which are boosted by hydraulic servos, or the like.

In such an aircraft, where there are two control stations, the controls are mechanically interconnected such that in the event that a pilot is unable to fly, the co-pilot is provided full authority. Additionally, it is possible for one pilot to override the other to instantaneously take control in the event of impending contact with an obstacle. Such control is accomplished by physically applying greater force to the mechanical controls.

To overcome certain limitations of mechanical controls, "sidearm" controllers have been developed which provide a single side-arm controller (control stick) which replaces numerous mechanical controls. In a dual piloted aircraft, each control station is provided with such a sidearm controller. An example of a sidearm controller is described in commonly owned U.S. Pat. No. 4,420,808 entitled "Multi-Axis Force Stick, Self-Trimmed Aircraft Flight Control System." The '808 patent discloses a sidearm controller which provides control signals in each of the pitch, roll, yaw and collective/lift axes of a helicopter control system. The stick is essentially a "force" stick in that there is limited displacement of the stick in each axis, and the magnitude of control signals is directly related to the magnitude and direction of force applied to the force stick. Such controllers are typically utilized in a fly-by-wire flight control system.

As opposed to the gross displacement of prior art mechanical systems which make command and control inputs of the pilot apparent to a co-pilot, no obvious co-pilot cues exist for limited displacement sidearm controllers. Furthermore, fly-by-wire systems have the capability of imparting far greater strength or authority to one of the cock-pit control stations, e.g., the pilot control station may be provided with greater authority to override the co-pilot control station. Accordingly, a decision that the pilot station shall be "stronger" can significantly degrade the control response or agility available to the co-pilot station. On the other hand, greater authority given to the co-pilot station can have the adverse effect of magnifying system sensitivity such that inadvertent inputs by the co-pilot will override pilot commands.

One possible solution to determining the priority of control signals between the pilot and the co-pilot is to provide full authority to the pilot whenever the pilot inputs a control input above a threshold magnitude. Therefore no authority will be given to the co-pilot unless the pilot is not inputting a control signal. When the pilot relinquishes control by reducing input below the threshold magnitude, co-pilot control signals are "faded-in" or "washed-in" to provide aircraft control. In the event of a malfunction of the pilot's control station, a push button switch on the co-pilot grip is provided to de-select the pilot control station and provide the co-pilot control station with instant acquisition of full cockpit authority. For the transition to occur smoothly, the co-pilot control signals may be faded or washed-in as opposed to a step input of a control signal. A problem associated with such a control system is that the co-pilot is unable to input small correcting commands or to "nudge" the aircraft as necessary. Additionally, if the pilot maintains full authority, the co-pilot is unable to react in an emergency situation without de-selecting the pilot control station.

Another proposed solution is to provide the pilot and co-pilot stations with equivalent authority. The signals provided by the pilot and co-pilot stations are summed to provide a total input signal to the control system. A problem associated with this type of control is that if the pilot and co-pilot input opposite control signals, the signals will cancel each other out. This is of particular concern in an obstacle avoidance or combat situation where an emergency maneuver is required. If the co-pilot and pilot react to the emergency situation by commanding opposite inputs, then no control of the aircraft is provided what so ever because the control inputs cancel each other out, therefore placing the aircraft in great jeopardy.

DISCLOSURE OF INVENTION

Objects of the invention include the provision of a dual station sidearm control system which controls the priority of a co-pilot station as a function of pilot input, and which maintains pilot or co-pilot control in the event of a system malfunction.

According to the present invention, the magnitude of pilot input control signals is monitored, and during pilot inputs of a magnitude less than a first threshold magnitude, pilot and co-pilot stations are given approximately equivalent control authority. When the pilot control inputs are greater than the first threshold magnitude, co-pilot inputs are significantly attenuated, thereby providing the pilot a high degree of control authority. When co-pilot input signals are greater than a second threshold, the mismatch between pilot and co-pilot control authority is reduced such that command inputs from the co-pilot station are approximately equivalent to the authority of command inputs from a pilot station.

In further accord with the present invention, the pilot and co-pilot stations are given approximately equivalent authority if pilot and co-pilot inputs are in the same direction.

The present invention provides a significant improvement over the prior art by providing a wholly new mode of priority sharing between pilot and co-pilot control stations. For small pilot inputs, the pilot and co-pilot are permitted approximately equivalent control priority to thereby permit transfer of control smoothly between stations and to permit an instructor pilot to work with a student pilot through small, uninhibited inputs, and additionally to permit the pilot and co-pilot to tolerate small malfunctions of either controller. As the pilot input increases above a first threshold magnitude however, opposing co-pilot inputs are greatly attenuated. In this situation, the pilot always has authority during a difference in control from the co-pilot so that one of the pilots is always in control of the aircraft. At very large co-pilot inputs, the authority mismatch between the pilot and co-pilot is attenuated so that the co-pilot can mitigate a situation where the pilot input fails in a hard over condition. In this situation, the co-pilot can input a command opposite the failed hard over condition to regain control of the aircraft prior to deselecting the pilot controller.

The foregoing and other objects, features and advantages of the present invention will become more apparent in the following detailed description of exemplary embodiments thereof, as illustrated in the accompanying drawings.

BEST MODE FOR CARRYING OUT THE INVENTION

The dual station sidearm control system of the present invention is particularly well suited for combining pilot and co-pilot input signals to provide approximately equivalent priority for small pilot inputs signals, pilot priority for override of co-pilot inputs for a range of pilot inputs above a first threshold value, and attenuation of the pilot/co-pilot authority mismatch for large co-pilot inputs.

Figure 1:
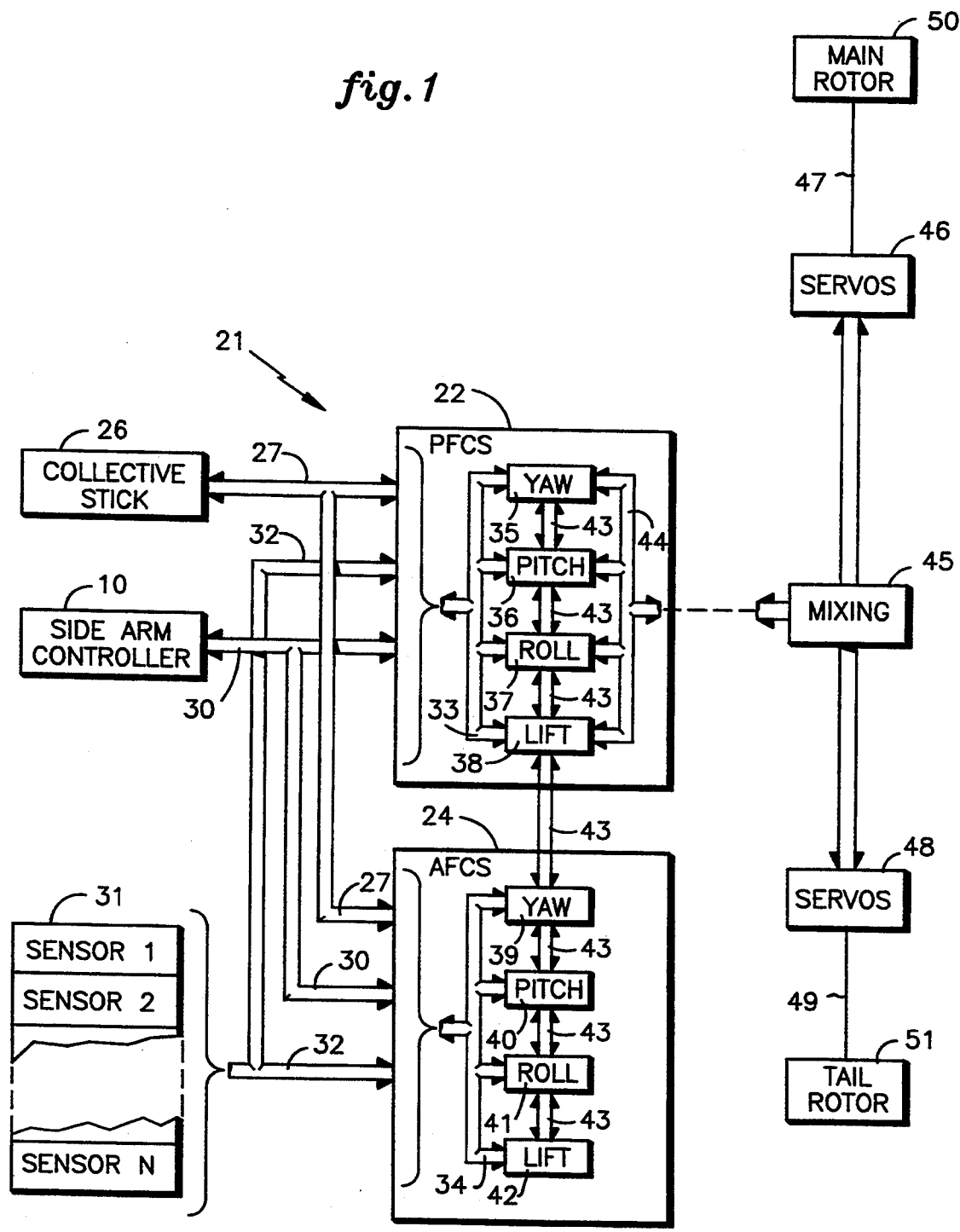
FIG. 1 is a schematic block diagram of a fly-by-wire flight control system.

Referring to FIG. 1, the dual station sidearm control system 10 of the present invention is intended for use with a fly-by-wire flight control system 21. The flight control system 21 includes a primary flight control system (PFCS) 22 and an automatic flight control system (AFCS) 24. The PFCS receives displacement command output signals from a displacement collective stick 26 on lines 27. The AFCS also receives collective stick discrete output signals on the lines 27. The PFCS and AFCS each receive force output command signals from dual four axis sidearm controllers 10 on lines 30. The AFCS and PFCS also receive sensed parameter signals from sensors 31 on lines 32. The pilot command signals on line 27 and 30 and the sensed parameter signals on lines 32 are shown consolidated within trunk lines 33 and 34 in the PFCS and AFCS, respectively.

The PFCS and AFCS each contain a control module for controlling the yaw, pitch, roll and lift axes of the aircraft. These modules are shown by blocks 35–38 for the PFCS and blocks 39–42 for the AFCS. The PFCS modules provide rotor command signals, and the AFCS modules provide conditioning and or trimming of the PFCS rotor command signals. The PFCS and AFCS modules are interconnected through bus 43.

The PFCS and AFCS use a model following algorithm in each control axis to provide rotor command signals on output lines 44 to a rotor mixing function 45 which commands displacement of mechanical servos 46 and linkages 47 to control the tip path plane of a main rotor 50. Additionally, the rotor mixing function 45 controls tail rotor servos 48 which control the thrust of a tail rotor 51 through linkages 49. The sensed parameter signals from sensors 31, on line 32, provide the PFCS and AFCS with the aircraft's angular rate and attitude response to the main rotor and tail rotor command signals. Additionally, the sensors provide information related to velocity, altitude, acceleration, etc., which information may not be used by the flight control system.

Figure 2:
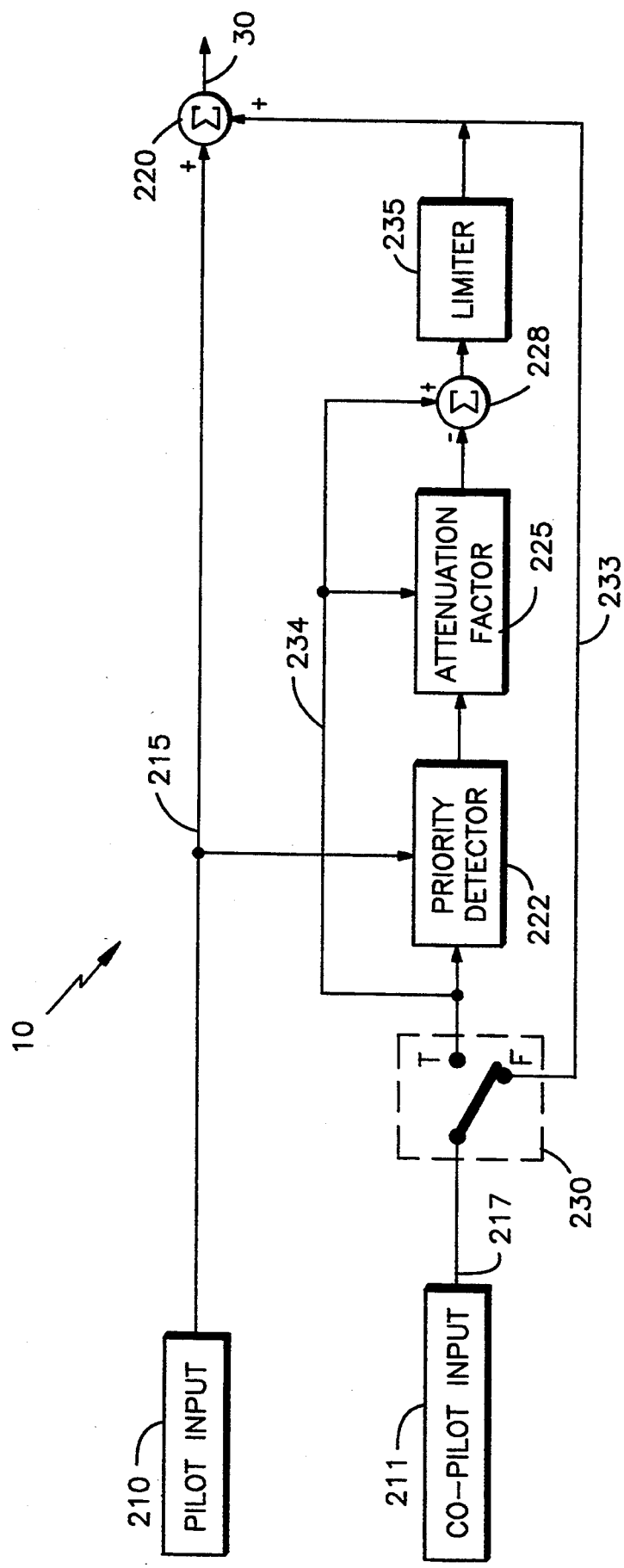
FIG. 2 is a schematic block diagram of a dual station side-arm control system for use with the flight control system of FIG. 1.

FIG. 2 illustrates the functional interconnection of the pilot station and co-pilot station in an aircraft having dual station sidearm controllers. FIG. 2 will be described with respect to the yaw axis modules 35, 39; however, it will be understood by those skilled in the art that the functional interconnection of FIG. 2 is equally applicable to flight control pitch, roll and lift axis modules.

A pilot sidearm controller 210 and a co-pilot sidearm controller 211 provide yaw axis command signals on lines 215 and 217 respectively. In the present embodiment, each side-arm controller is a four axis force stick in which yaw axis command signals are generated by the pilots lateral twisting (clockwise or counterclockwise) of the sidearm controller, pitch axis command signals are generated by the pilot pushing and pulling (front or back) the side-arm controller, roll axis command signals are generated by the pilot applying a left or right force to the sidearm controller, and collective (lift) commands are generated by the pilot applying an up or down force to the sidearm controller.

The pilot yaw axis command signal is provided on the line 215 to a summing junction 220. Additionally, the pilot yaw axis command signal is provided to a priority detector function 222. The priority detector function determines the amount of priority given to co-pilot yaw axis command signals in relation to pilot yaw axis command signals, as is in greater detail hereinafter with respect to FIG. 3.

The co-pilot yaw axis command signal is provided on the line 217 to a switch 230. When the magnitude of the pilot yaw axis command signal is below a minimum threshold magnitude, e.g., the pilot stick is in the detent position, the switch 230 remains deactivated, i.e., in the false or F position, and the co-pilot yaw axis command signal is provided directly on the line 233 to the summing junction 220. However, when the pilot input is greater than the minimum threshold magnitude, e.g., the pilot stick is out of the detent position, the switch 230 is activated to the true or T position, and the co-pilot yaw axis command signal is applied on a line 234 to the priority detector function 222 and an attenuator function 225. The attenuator function 225 determines the amount of attenuation of pilot yaw axis command signal priority based on the magnitude of the co-pilot input, as is described in greater detail hereinafter with respect to FIG. 4. The co-pilot yaw axis command signal is also provided on the line 234 to a summing junction 228, the output of which is applied to the summing junction 220 via a limiter 235. The output of the summing junction 220 is the combined dual station sidearm controller signal on the line 30.

When the switch 230 is activated to the true or T position, the co-pilot yaw axis command signal on line 234 is first applied to the priority detector function 222 wherein the reduction in co-pilot authority is determined based on the magnitude of the pilot input. Next, the output of the priority detector function is applied to the attenuator function wherein the reduction in co-pilot authority is attenuated, based on the magnitude of the co-pilot yaw axis command signal on the line 234. The output of the attenuator function is applied to the summing junction 228 where it is subtracted from the co-pilot yaw axis command signal on the line 234. The output of the summing junction 228 is applied to the limiter 235 which limits the minimum magnitude of the co-pilot yaw axis command signal to zero. Therefore, if the output magnitude of the attenuator function 228 is larger than the yaw axis command signal on the line 234, the output of the summing junction 228 will be negative, and the output of the limiter 235 will be zero.

The determination of co-pilot priority, i.e., the reduction in co-pilot priority, is based on the magnitude of the pilot yaw axis command signal, and is defined by equation 1 below:

$$y = \frac{10^{p/x}}{z} \quad \text{(eq. 1)}$$

Figure 3:
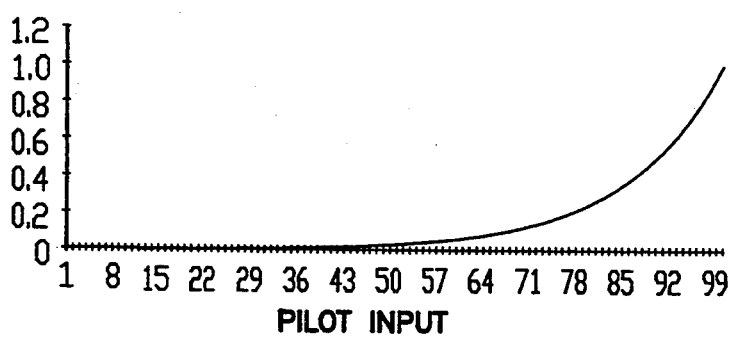
FIG. 3 is a graph showing the relationship between pilot input and pilot priority for a priority detector of the system of FIG. 2.

In equation 1, y is indicative of the percent reduction of co-pilot priority, p is indicative of the magnitude of the pilot input, x is a constant which determines the pilot acquisition priority and z is a constant which determines the amount of pilot priority. The result of equation 1 is graphically illustrated in FIG. 3. It can be seen using equation 1, as illustrated in FIG. 3, that co-pilot priority is determined using an exponential function wherein pilot yaw axis command signals are given greater priority than co-pilot yaw axis command signals as larger pilot yaw axis command signals are made.

The attenuator function 225 of FIG. 2 reduces the authority mismatch between pilot and of co-pilot command signals for large co-pilot command signals to thereby increase co-pilot priority in the event of a pilot control station failure to a hard over position. The amount of attenuation provided is based on the amount of co-pilot input as given by equation 2 below:

$$g = \left(1 - \frac{mc + b}{h}\right) * q \quad \text{(eq. 2)}$$

Figure 4:
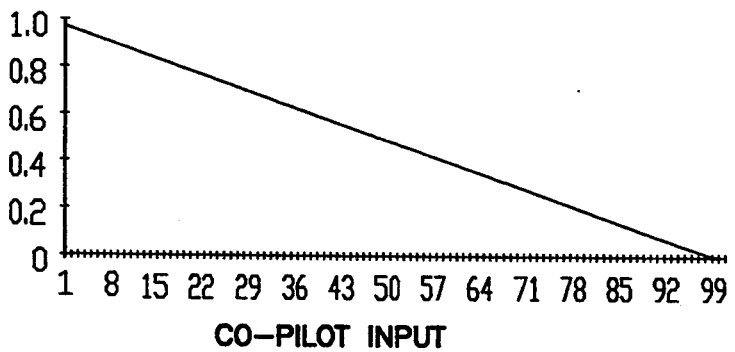
FIG. 4 is a graph showing the amount of attenuation provided by an attenuator function of FIG. 2.

In equation 2, g is indicative of the co-pilot reduction attenuation factor, c is indicative of co-pilot input, m is a constant which determines the level of attenuation, b is a constant which determines at which point the attenuation is present, and h and q are scaling factors for input measurement. The result of equation 2 is a linear relationship as illustrated in FIG. 4, which when combined with the pilot priority of FIG. 3 (equation 1), determines how much co-pilot input remains after application of the priority detector function 222 and the attenuator function 225.

The output of the summing junction 228 is a modified co-pilot yaw axis command signal (MC), as given in equation 3 below:

$$MC = c*(1-yg) \quad \text{(eq. 3)}$$

Figure 5:
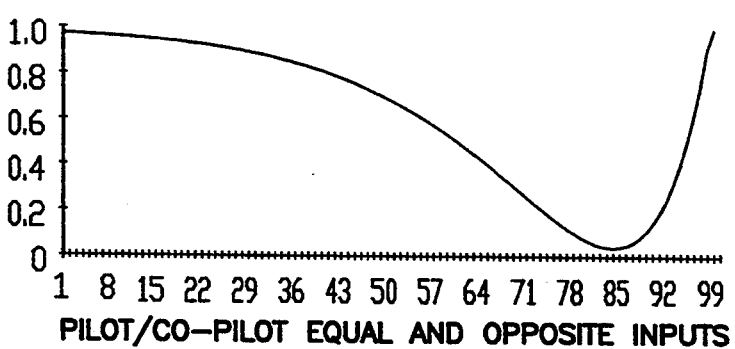
FIG. 5 is a graph showing co-pilot priority when a pilot and co-pilot are commanding equal and opposite control signals.

In equation 3, the quantity $(1-yg)$ is indicative of the co-pilot priority in relation to pilot priority. As can be seen in FIG. 2, all, i.e., 100%, of the pilot input is always provided to the summing junction 200. When the switch 230 is activated to the T position, the percentage of co-pilot input provided to the summing junction 220 is determined by the co-pilot priority $(1-yg)$. In FIGS. 5, 6, and 7, the vertical axis represents the co-pilot priority, which when multiplied by the co-pilot input, provides the modified co-pilot input provided to the summing junction 220.

An example of the results of equation 3 is graphically illustrated in FIG. 5 for a range of pilot and co-pilot input command signals wherein the pilot and co-pilot inputs are equal and opposite. It can be seen from this graph that for small yaw axis command signals, there is little effect on the co-pilot priority. For example, when both the pilot and co-pilot input is less than about 40% of input in a given axis, approximately 90% of the co-pilot input is provided to the summing junction 220, i.e., the co-pilot priority $(1-yg)$ is approximately equal to 0.9. However, for larger input signals, the co-pilot priority is diminished, thereby creating a mismatch between pilot and co-pilot priority such that the pilot control station dominates to control the aircraft. For example when both the pilot and co-pilot input is between about 50% and 90% of input in a given axis, less than 50% of the co-pilot input is provided to the summing junction 220, i.e., the co-pilot priority $(1-yg)$ is less than about 0.5. As the controllers approach full throw, the priority mismatch between the two control stations is attenuated such that the control stations have approximately equivalent priority in a hard over position of the controls. As described herein before, this ensures that either controller has the ability to mitigate (but not override) a full hard over on the other controller.

Figure 6A:
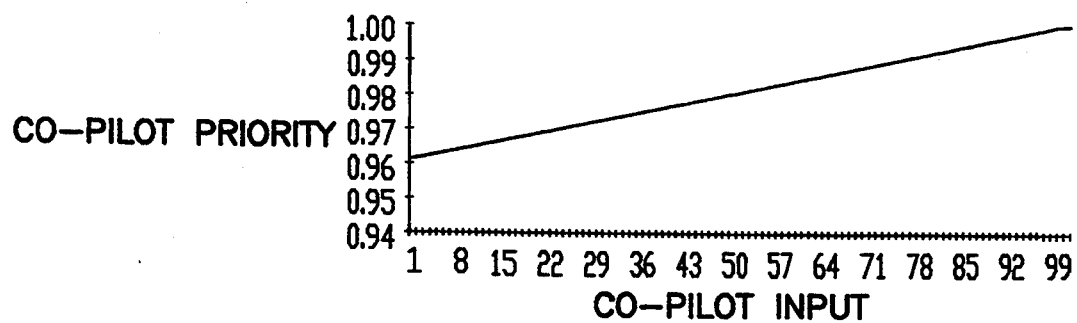
FIGS. 6a, 6b and 6c are graphs showing co-pilot priority for fixed amounts of pilot input.
Figure 6B:
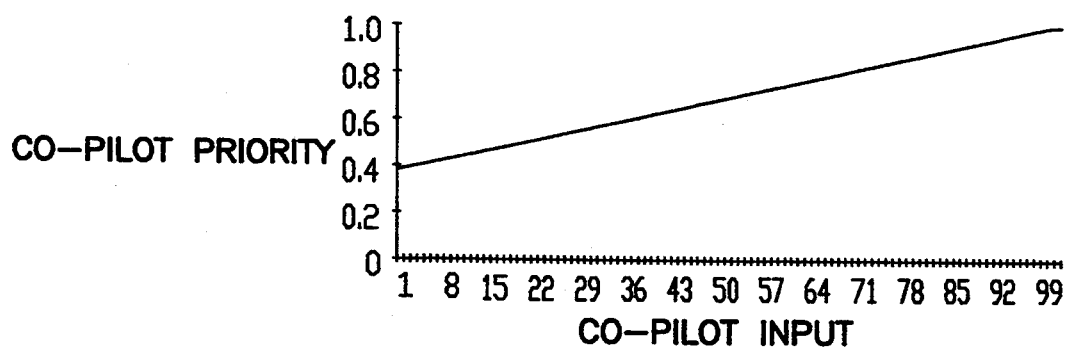
Figure 6C:
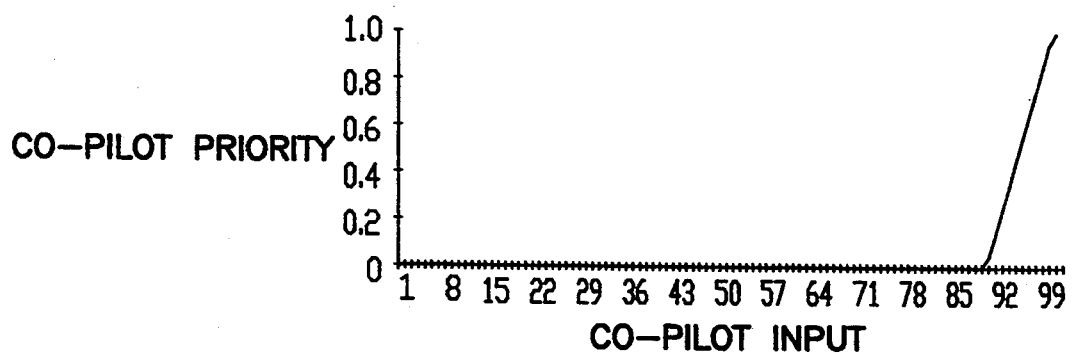

FIGS. 6a, 6b and 6c show the variation in co-pilot priority for various fixed amounts of pilot input. In FIG. 6a, if the pilot input is a small fixed amount, the co-pilot priority is approximately equivalent to pilot authority for the entire range of co-pilot inputs. If the pilot input is the mid-range of inputs, as illustrated in FIG. 6b, the co-pilot input is significantly reduced over the range of co-pilot inputs. Finally, as illustrated in FIG. 6c, for large pilot inputs, the co-pilot input is completely eliminated except for large co-pilot inputs to counteract a hard-over on the pilot controls.

Figure 7A:
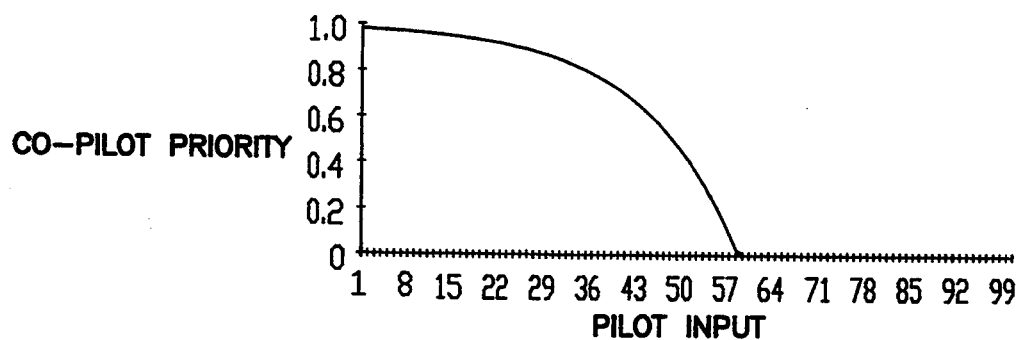
FIGS. 7a, 7b and 7c are graphs showing co-pilot priority for fixed amounts of co-pilot input.
Figure 7B:
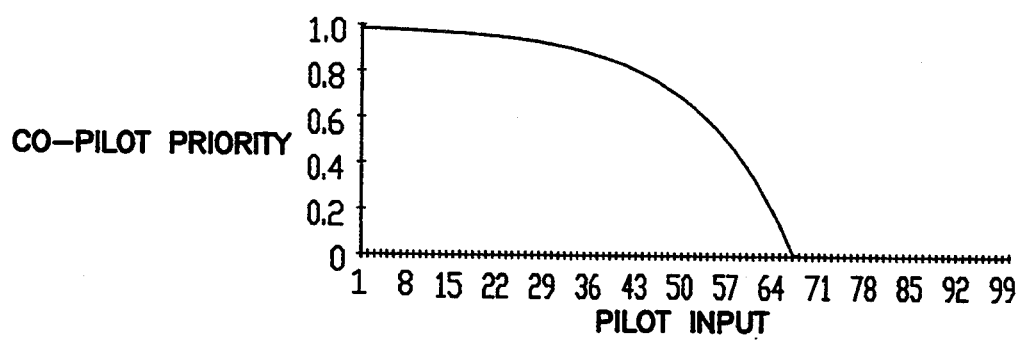
Figure 7C:
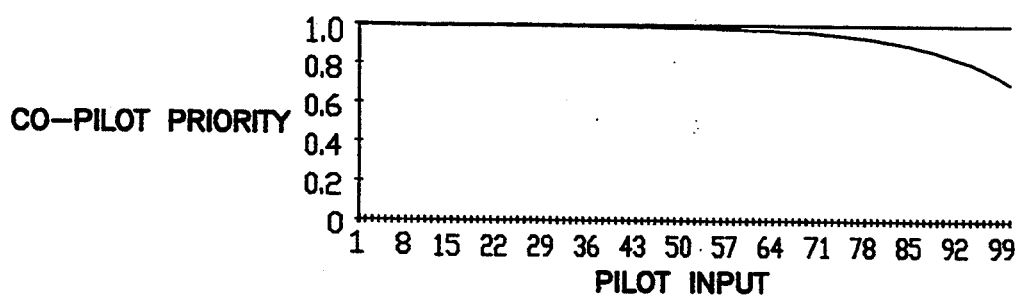

FIGS. 7a, 7b and 7c show the variation in co-pilot priority for various fixed amounts of co-pilot input over the range of pilot inputs. For small and medium co-pilot inputs, as illustrated in FIGS. 7a and 7b respectively, the co-pilot priority is approximately equivalent to pilot priority for small pilot inputs, and then rapidly falls off to zero for larger pilot inputs. If the co-pilot input is large, as illustrated by the solid line in FIG. 7c, co-pilot priority tails off only for very large pilot inputs. However, as illustrated by the dashed line in FIG. 7c, the co-pilot priority is not diminished whatsoever if the co-pilot control is hard over, as discussed herein above.

As will be apparent to those skilled in the art, the graphical figures, i.e., FIGS. 3 through 7, are provided for illustrative purposes only. The exact shapes of the curves which define priority and attenuation will depend on the constants selected for use in equations 1 and 2. Additionally, the equations themselves may be modified with additional constants as desired to provide the relationship between pilot and co-pilot priority needed for a given aircraft configuration or operational requirement.

The switch 230 was described herein as repositioning between the F and T positions in response to the positioning of the pilot control stick in or out of the detent position. However, additional or different logic may be provided for controlling the operation of switch 230. For example, logic may be provided to activate the switch to the T position when the pilot and co-pilot input opposite commands for the given attitude axis, and remain in the F position if the commands are in the same direction or if one or both of the controls remains in the detent position.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

I claim:

1. A system for controlling the priority of control signals received from a pilot control station and a co-pilot control station in a dual piloted aircraft, the control signals being used to provide dual station control signals for controlling aircraft attitude in at least one attitude axis, the pilot control station providing pilot control signals in response to pilot activation of a pilot sidearm controller, the co-pilot station providing co-pilot control signals in response to co-pilot activation of a co-pilot sidearm controller, the system being characterized by:
   priority means responsive to said pilot control signals for providing priority signals, the magnitude of said priority signals being related to the magnitude of said pilot control signals;
   attenuator means responsive to said co-pilot control signals for providing attenuation signals, the magnitude of said attenuation signals being related to the magnitude of said co-pilot control signals;
   co-pilot priority means responsive to said co-pilot control signals, said priority signals and said attenuation signals for providing modified co-pilot control signals; and
   means responsive to said pilot controls signals and said modified co-pilot control signals for providing said dual station control signals.

2. A system for controlling the priority of control signals according to claim 1 wherein the magnitude of said priority signals increases in response to an increase in the magnitude of said pilot control signals, said co-pilot priority means being responsive to an increase in the magnitude of said priority signals for reducing the magnitude of said modified co-pilot control signals.

3. A system for controlling the priority of control signals according to claim 2 wherein the magnitude of said priority signals is exponentially related to the magnitude of said pilot control signals.

4. A system for controlling the priority of control signals according to claim 1 wherein the magnitude of said attenuation signals increases in response to an increase in the magnitude of said co-pilot control signals, said co-pilot priority means being responsive to an increase in the magnitude of said attenuation signals for increasing the magnitude of said modified co-pilot control signals.

5. A system for controlling the priority of control signals according to claim 4 wherein the magnitude of said attenuation signals is directly related to the magnitude of said co-pilot control signals.

6. A system for controlling the priority of control signals according to claim 1 wherein the magnitude of said dual station control signals is equal to the sum of said pilot control signals and said co-pilot control signals when said pilot control signals and said co-pilot control signals are in the same direction in a given attitude axis.

7. A system for controlling the priority of control signals according to claim 1 wherein the magnitude of said dual station control signals is equal to said co-pilot control signals when the magnitude of said pilot control signals is less than a threshold magnitude.

8. A system for controlling the priority of control signals according to claim 7 wherein said threshold magnitude corresponds to said pilot controller being in a detent position.

9. A system for controlling the priority of control signals according to claim 1 wherein said pilot and co-pilot controllers are sidearm controllers.

10. A dual station sidearm control system having a pilot control station for providing pilot control signals in response to pilot activation of a pilot sidearm controller and a co-pilot station for providing co-pilot control signals in response to co-pilot activation of a co-pilot sidearm controller, said pilot control signals and said co-pilot control signals being combined to provide dual station control signals for controlling aircraft attitude in the yaw, pitch, roll and lift attitude axes, said system including:
    priority means responsive to said pilot control signals in one of said attitude axes for reducing the priority of said co-pilot control signals with respect to said pilot control signals in said one of said attitude axes as the magnitude of said pilot control signals increases in said one of said attitude axes;
    characterized by the improvement comprising:
        attenuator means responsive to said co-pilot control signals in said one of said attitude axes for attenuating the priority mismatch between said pilot control signals and said co-pilot control signals in said one of said attitude axes as the magnitude of said co-pilot control signals increases in said one of said attitude axes.

11. A dual station sidearm control system according to claim 10 wherein the magnitude of said dual station control signals in said one of said attitude axes is equal to said co-pilot control signals when the magnitude of said pilot control signals is less than a second threshold magnitude in said one of said attitude axes.

12. A dual station sidearm control system according to claim 11 wherein said second threshold magnitude corresponds to said pilot sidearm controller being in a detent position in said one of said attitude axes.

13. A dual station sidearm control system according to claim 11 wherein the priority of said co-pilot control signals decreases exponentially with respect to increases in the magnitude of said pilot control signals in said one of said attitude axes.

14. A dual station sidearm control system according to claim 10 wherein said priority means is responsive to the magnitude of said pilot control signals being less than a first threshold magnitude for providing co-pilot input signals approximately equivalent priority as said pilot input signals in said one of said attitude axes, and responsive to the magnitude of said pilot control signals being greater than said first threshold magnitude for reducing the priority of said co-pilot input signals with respect to said pilot input signals in said one of said attitude axes.

15. A dual station sidearm control system according to claim 14 wherein the priority of said co-pilot control signals decreases exponentially with respect to increases in the magnitude of said pilot control signals in said one of said attitude axes.

16. A dual station sidearm control system according to claim 14 wherein the magnitude of said dual station control signals in said one of said attitude axes is equal to said co-pilot control signals when the magnitude of said pilot control signals is less than a second threshold magnitude in said one of said attitude axes, and said second threshold magnitude corresponds to said pilot sidearm controller being in a detent position in said one of said attitude axes.

17. A dual station sidearm control system according to claim 10 wherein the magnitude of said dual station control signals in said one of said attitude axes is equal to the sum of said pilot control signals and said co-pilot control signals when said pilot control signals and said co-pilot control signals are in the same direction in one of said attitudes axes.

* * * * *